US012762726B2

(12) United States Patent
Latib et al.

(10) Patent No.: US 12,762,726 B2
(45) Date of Patent: Oct. 13, 2026

(54) RGBD-BASED NEURAL NETWORK AND TRAINING FOR POSE ESTIMATION

(71) Applicant: The Boeing Company, Arlington, VA (US)

(72) Inventors: Tameez Latib, Calabasas, CA (US); Leon Nguyen, Santa Ana, CA (US); Haden Smith, Guyton, GA (US); Fan Hin Hung, Los Angeles, CA (US); Deepak Khosla, Camarillo, CA (US)

(73) Assignee: The Boeing Company, Arlington, VA (US)

( * ) Notice: Subject to any disclaimer, the term of this patent is extended or adjusted under 35 U.S.C. 154(b) by 309 days.

(21) Appl. No.: 18/351,354

(22) Filed: Jul. 12, 2023

(65) Prior Publication Data

US 2025/0022157 A1 Jan. 16, 2025

(51) Int. Cl.
*G06T 7/70* (2017.01)
*G06T 7/593* (2017.01)

(52) U.S. Cl.
CPC ................ *G06T 7/70* (2017.01); *G06T 7/593* (2017.01); *G06T 2207/20081* (2013.01); *G06T 2207/20084* (2013.01)

(58) Field of Classification Search
CPC .. G06T 7/593; G06T 7/73; G06T 7/70; G06T 2207/20084; G06T 2207/20081;
(Continued)

(56) References Cited

U.S. PATENT DOCUMENTS

| | | | |
|---|---|---|---|
| 7,980,512 | B1 | 7/2011 | Speer |
| 8,348,022 | B2 | 1/2013 | Rusanen |

(Continued)

FOREIGN PATENT DOCUMENTS

| | | | |
|---|---|---|---|
| CN | 110097574 | | 8/2019 |
| EP | 3566949 | A1 | 11/2019 |

(Continued)

OTHER PUBLICATIONS

Lee, Andrew, et al. "Long-range pose estimation for aerial refueling approaches using deep neural networks." Journal of aerospace information systems 17.11 (2020): 634-646. (Year: 2020).*

(Continued)

*Primary Examiner* — Tracy Mangialaschi
(74) *Attorney, Agent, or Firm* — Massey Bean & Lewis

(57) ABSTRACT

Disclosed herein are methods, systems, and aircraft for performing image analysis for aiding refueling operations. A tanker aircraft includes a camera system configured to generate a two-dimensional (2D) image of a receiving aircraft and a depth image of the receiving aircraft, a processor, and non-transitory computer readable storage media storing code. The code is executable by the processor to perform operations including detecting the receiving aircraft within the 2D image based on 2D image values, determining 2D keypoints of the receiving aircraft located within the 2D image based on the depth image, the 2D image values, and a previously determined keypoint model, determining a 6 degree-of-freedom (6DOF) pose using the 2D keypoints and corresponding three-dimensional (3D) keypoints, and outputting a position of at least a component of the receiving aircraft based on the 6DOF pose.

20 Claims, 6 Drawing Sheets

(58) Field of Classification Search
CPC . G06T 2207/30252; G06T 2207/10021; G06T 2207/10028; G06T 2207/10024
See application file for complete search history.

(56) References Cited

U.S. PATENT DOCUMENTS

| | | | |
|---|---|---|---|
| 8,854,433 | B1 | 10/2014 | Rafii |
| 8,994,723 | B2 | 3/2015 | Drost et al. |
| 9,150,310 | B1 | 10/2015 | Bray et al. |
| 10,565,731 | B1 | 2/2020 | Reddy |
| 10,909,715 | B1 | 2/2021 | Boggs |
| 10,929,654 | B2 | 2/2021 | Iqbal et al. |
| 10,937,189 | B2 | 3/2021 | Li et al. |
| 11,254,440 | B2 | 2/2022 | Ropers |
| 11,459,116 | B2 | 10/2022 | Kyono et al. |
| 11,748,913 | B2 | 9/2023 | Ali et al. |
| 11,827,203 | B2 | 11/2023 | Chakravarty |
| 11,880,503 | B1 | 1/2024 | Haentjens |
| 2007/0023575 | A1 | 2/2007 | von Thal |
| 2017/0073080 | A1 | 3/2017 | Hughes |
| 2018/0173839 | A1 | 6/2018 | Fang |
| 2018/0178924 | A1 | 6/2018 | Zomeno Rodríguez |
| 2019/0031347 | A1 | 1/2019 | Duan |
| 2019/0344902 | A1 | 11/2019 | Cramblitt |
| 2019/0355150 | A1 | 11/2019 | Tremblay et al. |
| 2019/0382126 | A1 | 12/2019 | Rix et al. |
| 2020/0217666 | A1 | 7/2020 | Zhang |
| 2020/0226426 | A1 | 7/2020 | Jarquin Arroyo |
| 2021/0117661 | A1 | 4/2021 | Iqbal |
| 2021/0304438 | A1 | 9/2021 | Ye |
| 2021/0314551 | A1 | 10/2021 | Tang |
| 2022/0075994 | A1 | 3/2022 | Shapira |
| 2022/0108468 | A1 | 4/2022 | Nakamura |
| 2022/0212811 | A1 | 7/2022 | Deepak et al. |
| 2022/0215571 | A1 | 7/2022 | Leach |
| 2022/0258875 | A1 | 8/2022 | Kyono |
| 2022/0276652 | A1 | 9/2022 | Kyono et al. |
| 2022/0277472 | A1 | 9/2022 | Birchfield |
| 2022/0292772 | A1 | 9/2022 | Wang |
| 2022/0306311 | A1 | 9/2022 | Kyono |
| 2022/0413119 | A1 | 12/2022 | Starr et al. |
| 2022/0414911 | A1 | 12/2022 | Wang et al. |
| 2023/0244835 | A1 | 8/2023 | Guo |
| 2023/0244905 | A1 | 8/2023 | Zoldi |
| 2023/0281864 | A1 | 9/2023 | Guo |
| 2023/0281945 | A1 | 9/2023 | Cashman |
| 2024/0375786 | A1 | 11/2024 | Hung et al. |
| 2024/0378744 | A1 | 11/2024 | Smith et al. |
| 2024/0391494 | A1 | 11/2024 | Rosenblum |
| 2025/0011002 | A1 | 1/2025 | Latib et al. |
| 2025/0164944 | A1 | 5/2025 | Oyama |
| 2025/0171159 | A1 | 5/2025 | Hung et al. |
| 2025/0173575 | A1 | 5/2025 | Hung et al. |
| 2025/0173897 | A1 | 5/2025 | Hung et al. |
| 2025/0173898 | A1 | 5/2025 | Hung et al. |
| 2025/0178741 | A1 | 6/2025 | Hung et al. |
| 2025/0182398 | A1 | 6/2025 | Hung et al. |
| 2025/0190906 | A1 | 6/2025 | Yin |

FOREIGN PATENT DOCUMENTS

| | | |
|---|---|---|
| EP | 4024340 | 7/2022 |
| EP | 4024346 | 7/2022 |
| WO | 2025003634 | 1/2025 |

OTHER PUBLICATIONS

Parsons, Christopher, et al. "Analysis of simulated imagery for real-time vision-based automated aerial refueling." Journal of aerospace information systems 16.3 (2019): 77-93. (Year: 2019).*
Hao, Gangtao, et al. "Scale-unambiguous relative pose estimation of space uncooperative targets based on the fusion of three-dimensional time-of-flight camera and monocular camera." Optical Engineering 54.5 (2015): 053112-053112. (Year: 2015).*
Extended European Search Report for EP Patent Application No. 24165111.6 dated Jul. 10, 2024.
Lynch, J. C., Monocular Pose Estimation for Automated Aerial Refueling via Perspective-n-PointPerspective-n-Point, AFIT Scholar, Mar. 2022, pp. 1-76, accessed from https://scholar.afit.edu/cgi/viewcontent.cgi?article=7913&context=etd Jul. 17, 2024.
Extended European Search Report for EP Patent Application No. 24171550.7 dated Oct. 16, 2024, pp. 1-13.
Gupta, et al., "CullNet: Calibrated and Pose Aware Confidence Scores for Object Pose Estimation", 2019 IEEE/CVF International Conference on Computer Vision Workshop (ICCVW), IEEE, Oct. 27, 2019, pp. 2758-2766.
Klein, et al., "Uncertainty in Data-Driven Kalman Filtering for Partially Known State-Space Models", ICASSP 2022—2022 IEEE International Conference on Acoustics, Speech, and Signal Processing (ICASSP), IEEE, May 23, 2022, pp. 3194-3198.
Shi, et al., "Fast Uncertainty Quantification for Deep Object Pose Estimation", Arvix.org, Cornell University Library, Nov. 16, 2020, pp. 1-8.
Teng Chin-Hung, "Enhanced Outlier Removal for Extended Kalman Filter based Visual Inertial Odometry", 2018 IEEE International Conference on Applied System Innovation (ICASI), IEEE, Apr. 13, 2018, pp. 74-77.
Extended European Search Report for EP Patent Application No. 24182647.8 dated Oct. 24, 2024, pp. 1-7.
Extended European Search Report for EP Patent Application No. 24183945.5 dated Nov. 20, 2024, pp. 1-8.
Lee, et al., "Long-Range Pose Estimation for Aerial Refueling Approaches Using Deep Neural Networks", Journal of Aerospace Information Systems, vol. 17, No. 11, Nov. 1, 2020, pp. 634-646.
Thomas, et al., "Advances in air to air refuelling", Progress in Aerospace Sciences, vol. 71, Jul. 28, 2014, pp. 14-35.
Extended European Search Report for EP Patent Application No. 24192391.1 dated Jan. 24, 2025, pp. 1-13.
Extended European Search Report for EP Patent Application No. 24192395.2 dated Jan. 24, 2025, pp. 1-12.
Li et al., Deep Supervision with Intermediate Concepts, IEEE Transactions on Pattern Analysis and Machine Intelligence, Aug. 2019, pp. 1828-1843, vol. 41, No. 8.
Reddy et al,. Occlusion-Net: 2D/3D Occluded Keypoint Localization Using Graph Networks, 2019, IEEE/CVF Conference on Computer Vision and Pattern Recognition, pp. 7318-7327, IEEE Computer Society.
Park et al., Robust multi-task learning and online refinement for spacecraft pose estimation across domain gap, 2023, pp. 1-15, Advances in Space Research.
Gong et al., Research of an Unmanned Aerial Vehicle Autonomous Aerial Refueling Docking Method Based on Binocular Vision, 2023, pp. 1-21, 7, 433.
Morreale et al., Neural Semantic Surface Maps, Sep. 9, 2023, pp. 1-15.
Reed, Benjamin B., The Restore-L Servicing Mission, Mar. 29, 2016, pp. 1-32, retrieved from URL:https://www.nasa.gov/wp-content/uploads/2015/03/reed_restorel_tagged.pdf Jan. 14, 2025.
Extended European Search Report for EP Patent Application No. 24200751.6 dated Mar. 7, 2025.
Dementhon, et al., Model-Based Object Pose in 25 Lines of Code, pp. 1-9, 1992.
Extended European Search Report for EP Patent Application No. 24196940.1 dated Mar. 7, 2025.
Wang et al., Revisiting Monocular Satellite Pose Estimation With Transformer, IEEE Transactions on Aerospace and Electronic Systems, Oct. 2022, pp. 4279-4294, vol. 58, No. 5.
Chen et al., Satellite Pose Estimation with Deep Landmark Regression and Nonlinear Pose Refinement, Computer Vision Foundation, 2019, pp. 1-9.
Quang et al., Monocular Vision and Machine Learning for Pose Estimation, 2023, pp. 128-136.
Extended European Search Report for EP Patent Application No. 24196935.1 dated Feb. 6, 2025.
Shi et al., Fast Uncertainty Quantification for Deep Object Pose Estimation, IEEE International Conference on Robotics and Automation, May 2021, pp. 5200-5207.

(56) References Cited

OTHER PUBLICATIONS

Vaghi et al., A Comparison of Uncertainty Estimation Approaches for DNN-based Camera Localization, Nov. 2022, pp. 1-7.
Extended European Search Report for EP Patent Application No. 21205493.6 dated Mar. 31, 2022.
Doebbler, et al., "Boom and Receptacle Autonomous Air Refueling Using Visual Snake Optical Sensor", Journal of Guidance and Control and Dynamics, Nov. 1, 2007, pp. 1753-1769, vol. 30, No. 6.
Anderson, et al., "Augmenting Flight Imagery from Aerial Refueling", Oct. 21, 2019, Computer Vision—ECCV 2020 : 16th European Conference, Glasgow, UK, Aug. 23-28, 2020, pp. 154-165, Proceedings; [Lecture Notes in Computer Science ; ISSN 0302-9743], Springer International Publishing, Cham.
Soujanya, et al. "Addressing corner detection issues for machine vision based UAV aerial refueling" Machine Vision and Applications, Springer, Jan. 10, 2007, pp. 261-276, vol. 18, No. 5, Berlin, DE.
Duan, et al., "Visual Measurement in Simulation Environment for Vision-Based UAV Autonomous Aerial Refueling", IEEE Transactions on Instrumentation and Measurement, IEEE, USA, Sep. 1, 2015, pp. 2468-2480, vol. 64, No. 9, USA.
Cui, et al., "Visual Servoing of a Flexible Aerial Refueling Boom With an Eye-in-Hand Camera", IEEE Transactions on Systems, Man, and Cybernetics: Systems, IEEE, Jan. 8, 2020, pp. 6282-6292, vol. 51, No. 10, Piscataway, NJ, USA.
Lakshminarayanan, et al. "Simple and Scalable Predictive Uncertainty Estimation using Deep Ensembles", 31st Conference on Neural Information Processing Systems (NIPS 2017), 2017, pp. 1-15, Long Beach, CA, USA.
Shen, et al., "Real-Time Uncertainty Estimation in Computer Vision via Uncertainty-Aware Distribution Distillation", Computer Vision Foundation, 2021, pp. 707-716.
Peng, et al., "PVNet: Pixel-wise Voting Network for 6DoF Pose Estimation", Computer Vision Foundation, pp. 4561-4570, 2019.
Brachmann, et al., "Uncertainty-Driven 6D Pose Estimation of Objects and Scenes from a Single RGB Image", Computer Vision Foundation, pp. 3364-3372, 2016.
Rasmussen, C.E., "Gaussian Processes in Machine Learning", Max Planck Institute for Biological Cybernetics, pp. 63-71, Tubingen, Germany, 2006.
Romano, et al., "Conformalized Quantile Regression", 33rd Conference on Neural Information Processing Systems, 2019, pp. 1-11, Vancouver, Canada.
Ratzlaff, et al. "Generative Particle Variational Inference via Estimation of Functional Gradients", Proceedings of the 38 th International Conference on Machine, 2021, pp. 1-22.
Tobin et al., "Domain Randomization for Transferring Deep Neural Networks from Simulation to the Real World", https://arxiv.org/pdf/1703.06907.pdf, accessed Dec. 5, 2023, pp. 1-8.
Mehta, et al. "Active Domain Randomization", https://arxiv.org/pdf/1904.04762.pdf, accessed Dec. 5, 2023, pp. 1-15.
Akkaya et al., "Solving Rubik's Cube With a Robot Hand", https://arxiv.org/pdf/1910.07113.pdf, accessed Dec. 5, 2023, pp. 1-51.
Zhao, et al., "Estimating 6D Pose From Localizing Designated Surface Keypoints", https://arxiv.org/pdf/1812.01387.pdf, accessed Dec. 5, 2023, pp. 1-9.
Xiao et al., "Simple Baselines for Human Pose Estimation and Tracking", https://arxiv.org/pdf/1804.06208.pdf, accessed Dec. 5, 2023, pp. 1-9.
Suwajanakorn, et al., "Discovery of Latent 3D Keypoints via End-to-end Geometric Reasoning", https://keypointnet.github.io/keypointnet_neurips.pdf, accessed Dec. 5, 2023, pp. 1-12.
Lee, et al., "Camera-to-Robot Pose Estimation from a Single Image", 2020 IEEE International Conference on Robotics and Automation (ICRA), 2020, pp. 9426-9432, Paris, France.
Bashir, et al., "Small Object Detection in Remote Sensing Images with Residual Feature Aggregation-Based Super-Resolution and Object Detector Network", Remote Sens., 2021, 13, 1854, pp. 1-21.
Unel, et al., "The Power of Tiling for Small Object Detection", Computer Vision Foundation, pp. 1-10, 2019.
Lee, et al., "Online Extrinsic Camera Calibration for Temporally Consistent IPM Using Lane Boundary Observations with a Lane Width Prior", https://arxiv.org/pdf/2008.03722.pdf, accessed Dec. 5, 2023, pp. 1-6.
Zhang, et al., "A Flexible Online Camera Calibration Using Line Segments", Journal of Sensors, 2016, vol. 2016, Article ID 2802343, pp. 1-17, Hindawi Publishing Corporation.
Liu et al., Simple and Principled Uncertainty Estimation with Deterministic Deep Learning via Distance Awareness, 34th Conference on Neural Information Processing Systems, 2020, pp. 1-15, Vancouver, CA.
Guo et al., On Calibration of Modern Neural Networks, Proceedings of the 34th International Conference on Machine Learning, Aug. 3, 2017, pp. 1-14, Sydney, Australia.
Pavlakos, et al., 6-DoF Object Pose from Semantic Keypoints, 2017 IEEE Internation Conference on Robotics and Automation, pp. 1-8.
Newell et al., Stacked Hourglass Networks for Human Pose Estimation, Jul. 2016, pp. 1-17, article obtain from https://arxiv.org/pdf/1603.06937 Sep. 16, 2025.
EP Office Action for EP Patent Application No. 24 182 647.8 dated Mar. 17, 2026.
Fu, et al. "The 60 pose estimation of the aircraft using geometric property." IEEE Transactions on Circuits and Systems for Video Technology, Jul. 2023, pp. 3358-3368, vol. 33, No. 7.
Hashemi, M., "Enlarging smaller images before inputting into convolutional neural network: zero-padding vs. interpolation." Journal of Big Data, 2019, pp. 1-13.
Saponara, et al. Impact o Image Resizing on Deep Learning Detectors for Training Time and Model Performance, Department of Information Engineering, University of Pisa, Italy, 2022, pp. 10-17.
Fomalczyk et al, "Robust face model based aproach to head pose estimation," Proceedings of the FedCSIS, IEEE 2017, pp. 1291-1295.
Wang et al., Normalized Object Coordinate Space for Category-Level 6D Object Pose and Size Estimation, 2019, pp. 2637-2646, 2019 IEEE/CVF Conference on Computer Vision and Pattern Recognition.
Oksuz et al., "Imbalance Problems in Object Detection: A Review," Mar. 11, 2020, accessed https://arxiv.org/abs/1909.00169 on Jul. 14, 2026.
Dao et al., "A Kernel Theory of Modern Data Augmentation," Mar. 21. 2019, accessed https://arxiv.org/pdf/1803.06084 on Jul. 14, 2026.

* cited by examiner

RGBD-BASED NEURAL NETWORK AND TRAINING FOR POSE ESTIMATION

FIELD

This disclosure relates generally to close vehicle operations, and more particularly to safe aerial refueling operations.

BACKGROUND

Cameras provide information for aerial refueling operations. However, accurately and efficiently conducting a refueling operation using cameras can be difficult when practicing current techniques.

SUMMARY

The subject matter of the present application has been developed in response to the present state of the art, and in particular, in response to the shortcomings of conventional aerial refueling techniques, that have not yet been fully solved by currently available techniques. Accordingly, the subject matter of the present application has been developed to provide systems and methods for providing aerial refueling techniques that overcome at least some of the above-discussed shortcomings of prior art techniques.

The following is a non-exhaustive list of examples, which may or may not be claimed, of the subject matter, disclosed herein.

In one example, a method includes receiving a two-dimensional (2D) image from an imaging device of a first device, detecting a second device within the 2D image based on 2D image values, receiving a depth image from the imaging device, determining 2D keypoints of the second device located within the 2D image based on the depth image, the 2D image values, and a previously determined keypoint model, determining a 6 degree-of-freedom (6DOF) pose using the 2D keypoints and corresponding three-dimensional (3D) keypoints; and outputting a position of at least a component of the second device based on the 6DOF pose In another example, a tanker aircraft includes a camera system configured to generate a 2D image of a receiving aircraft and a depth image of the receiving aircraft, a processor, and non-transitory computer readable storage media storing code. The code is executable by the processor to perform operations including detecting the receiving aircraft within the 2D image based on 2D image values, determining 2D keypoints of the receiving aircraft located within the 2D image based on the depth image, the 2D image values, and a previously determined keypoint model, determining a 6DOF pose using the 2D keypoints and corresponding 3D keypoints, and outputting a position of at least a component of the receiving aircraft based on the 6DOF pose.

In still another example, a refueling system includes a processor and non-transitory computer readable storage media storing code. The code being executable by the processor to perform operations including receiving a 2D image from an imaging device of a first device, detecting a second device within the 2D image based on 2D image values, receiving a depth image from the imaging device, determining 2D keypoints of the second device located within the 2D image based on the depth image, the 2D image values, and a previously determined keypoint model, determining a 6DOF pose using the 2D keypoints and corresponding 3D keypoints, and outputting a position of at least a component of the second device based on the 6DOF pose.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a system located on a first vehicle that tracks a second vehicle by utilizing visual/trucolor images and depth images of the second vehicle to estimate where the second vehicle is located in space. This tracked information may be used for autonomous control purposes or visual guidance during close vehicle operations, such as, without limitation, an aerial refueling operation.

Figure 1:
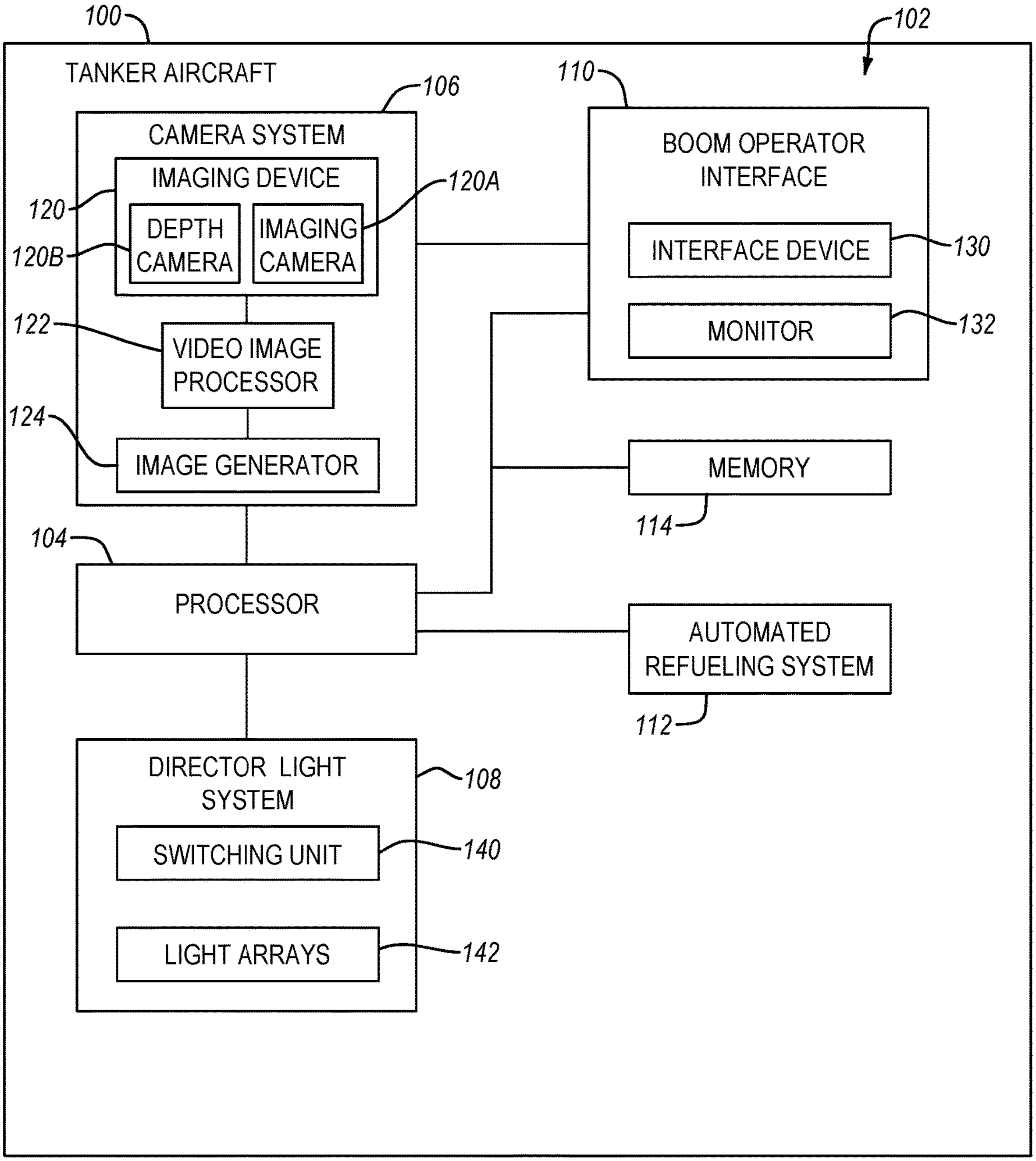
FIG. 1 is a schematic block diagram of a tanker aircraft with an automated refueling system, according to one or more examples of the present disclosure.
Figure 2:
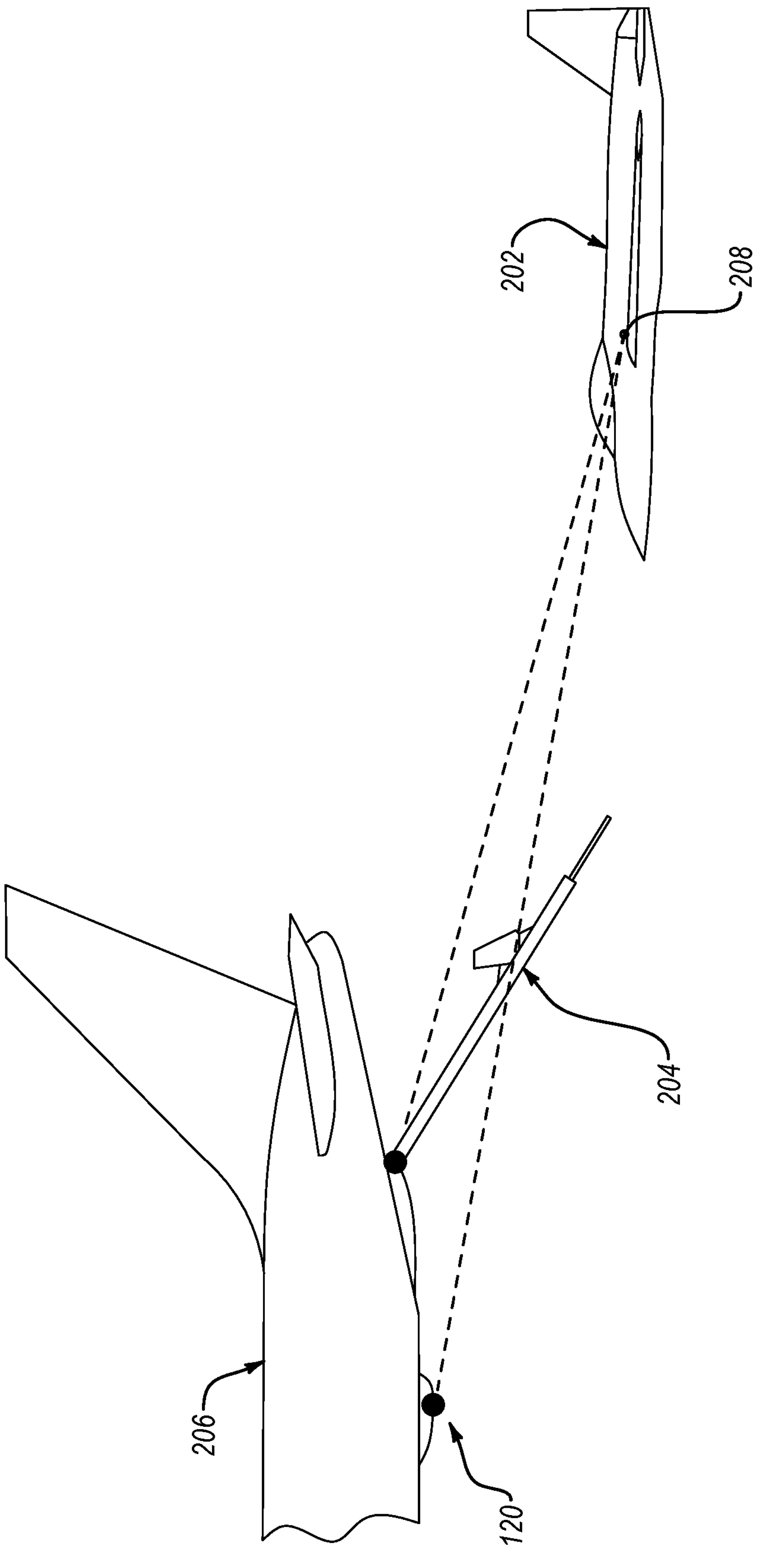
FIG. 2 is a schematic, side elevation view of an aircraft refueling operation, according to one or more examples of the present disclosure.

As shown in FIGS. 1 and 2, in various examples, a refueling system 102 includes a processor 104, a camera system 106, a director light system 108, a boom operator interface 110, an automated refueling system 112, and memory 114.

In various examples, the camera system 106 includes an imaging device 120, a video image processor 122, and an image generator 124. The imaging device 120 is mounted approximately to a fixed platform within a fared housing attached to a lower aft portion of a fuselage 206 of a tanker aircraft 100. The imaging device 120 includes a lens or lenses having remotely operated focus and zoom capability. The imaging device 120 is located in an aft position relative to and below the fuselage 206 of the tanker aircraft 100. The video image processor 122 receives digitized video images from the imaging device 120 and generates real-time 2D video images. The digitized video images include the objects viewed by the imaging device 120 within a vision cone, specifically, the boom 204 and the receiver aircraft 202. The image generator 124 then generates images for presentation on a monitor 132 of the boom operator interface 110.

Figure 3:
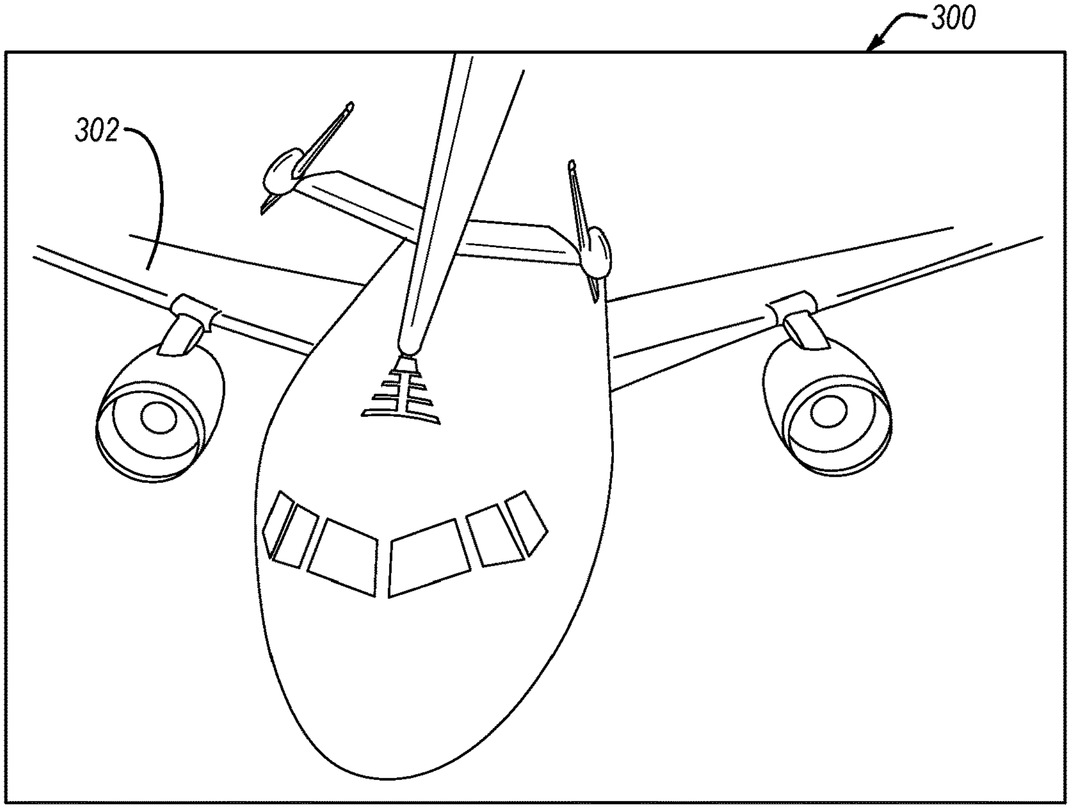
FIG. 3 is a camera view of a receiving aircraft during a refueling operation, according to one or more examples of the present disclosure.

The camera system 106 is configured to produce a two-dimensional (2D) visual image 300 of a three-dimensional (3D) space, including at least the refueling boom 204 of a tanker aircraft 302, in a deployed state, and the receiver aircraft 202 (see, e.g., FIG. 3). The 2D image 300 includes an approach zone into which the receiver aircraft 202 enters prior to beginning refueling operations. The receiver aircraft 202 includes a boom nozzle receiver 208 capable of being coupled to the refueling boom 204 so that fuel from the tanker aircraft 100 can be transferred to the receiver aircraft 202 in an aerial refueling operation. The visual image 300 includes image values as will be described in more detail below.

Figure 4:
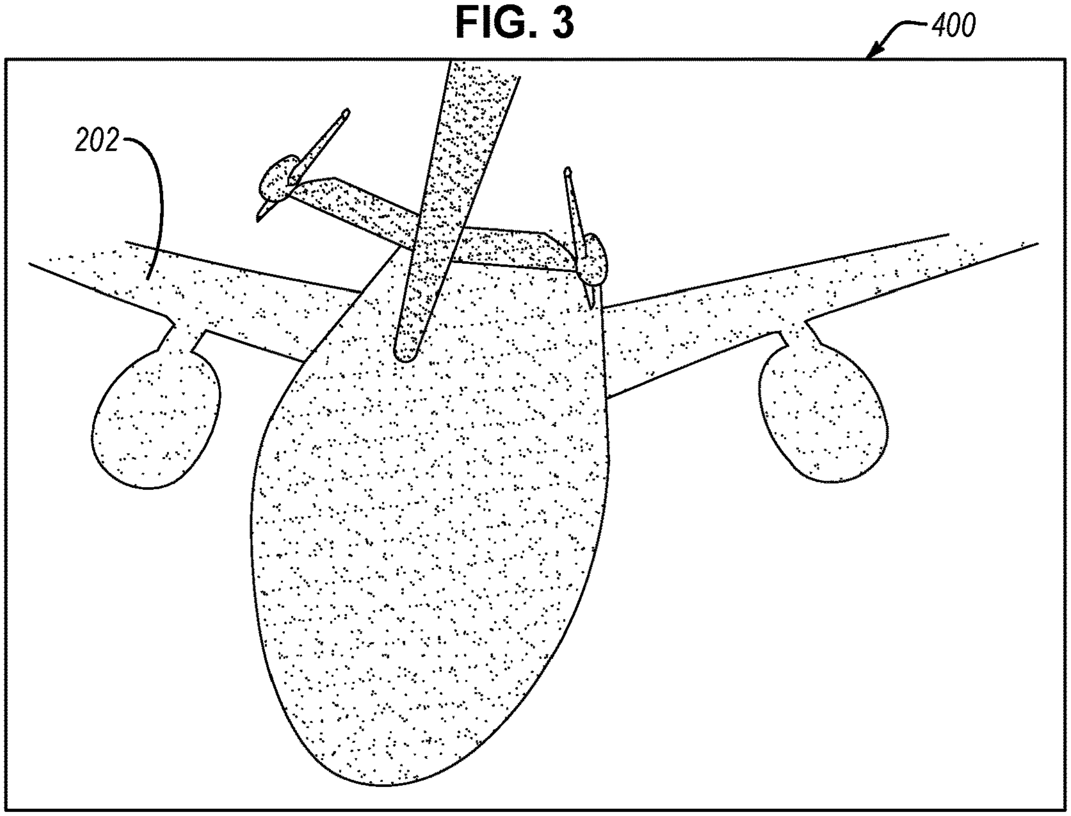
FIG. 4 is a depth image generated by range camera, according to one or more examples of the present disclosure.

Referring to FIG. 1, the camera system 106 further includes a conventional imaging camera 120A and a conventional depth camera 120B. The depth camera 120B is configured to produce a depth image 400 of the 3D space occupied by the receiver aircraft 202 and/or the deployed refueling boom 204 (see, e.g., FIG. 4). The depth image 400 includes the receiver aircraft 202 as it enters into a refueling operation. The depth camera 120B may be combined with the conventional imaging camera 120A, such as a stereoscopic camera system or the depth camera 120B may be a range sensing device or any device with depth sensing capabilities.

In various examples, the boom operator interface 110 includes a user interface device 130 and a monitor 132. Images presented on the monitor 132 are based on information provided by the processor 104. The director light system 108 includes a switching unit 140 and a light array 142 (i.e., pilot director lights). The switching unit 140 controls activation of the light array 142 based on information provided by the processor 104. The automated refueling system 112 controls operation of the refueling boom 204 and/or the tanker aircraft 100, to executing an aerial refueling operation, based on information provided by the processor 104.

In various examples, referring to FIG. 1, the light array 142 is located on the lower forward portion of the fuselage 206 of the tanker aircraft 100. The light array 142 is positioned to be clearly viewable by the pilot of the receiver aircraft 202. Moreover, the light array 142 includes various lights for providing directional information to the pilot of the receiver aircraft 202. The light array 142 may include an approach light bar, an elevation light bar, a fore/aft position light bar, four longitudinal reflectors, two lateral reflectors, or other lights.

It can be appreciated that refueling or close quarter operations may occur between vehicles other than aircraft. The refueling or close quarter operations may occur during adverse weather conditions. The vehicles may be any vehicles that move relative to each other (in water, on land, in air, or in space). The vehicles may also be manned or unmanned. Given by way of non-limiting example, in various examples, the vehicles are motor vehicles driven by wheels and/or tracks, such as, without limitation, an automobile, a truck, a cargo van, and the like. Given by way of further non-limiting examples, in various examples, the vehicles are marine vessels such as, without limitation, a boat, a ship, a submarine, a submersible, an autonomous underwater vehicle (AUV), and the like. Given by way of further non-limiting examples, in various examples, the vehicles are manned or unmanned aircraft such as, without limitation, a fixed wing aircraft, a rotary wing aircraft, and a lighter-than-air (LTA) craft.

In various examples, non-transitory computer readable instructions (i.e., code) stored in the memory 114 (i.e., storage media) cause the processor 104 to use raw image data from a sensor (i.e., the imaging device 120) and make the raw data scalable and cost effective to integrate into existing systems. In particular, the processor 104 performs object detection and keypoint detection of the receiving aircraft 202 within the 2D image 300 based on the raw image data that includes a visible/trucolor image values (e.g., red, green, and blue (RGB) values, other color values, or intensity values) and a depth (D) image (e.g., an RGBD images). Accordingly, the keypoints are referenced in 2D space. Keypoint detection (i.e., prediction) is based on a trained deep neural network configured to estimate the pixel location of the keypoints of the receiving aircraft 202 in the 2D image 300. The processor 104 then performs 2D to 3D correspondence, using a 3D point-matching algorithm, by projecting the 2D keypoints into 3D space. Each of the predicted 2D keypoints is projected from 2D space to 3D space using a perspective-n-point (PnP) pose computation to produce a prediction of the receiving aircraft 202. The PnP pose computation solves for 6 degrees-of-freedom (DOF) parameters (the 3D translation and rotation) through optimization given the following: (1) the 2D predicted keypoints from the trained neural network; (2) the 3D corresponding keypoints from a receiver CAD model 524; and (3) camera intrinsic K matrix and distortion parameters (these determine how the 3D world is projected onto the 2D image). In another embodiment, an optimization process iteratively tries different 6 DOF solutions until reprojection error is minimized (this is the difference between (1) above and the projection of (2) onto the image using the camera parameters of (3)).

In various examples, 6DOF pose estimation (i.e., an estimate of the 3D position (x, y, z) and orientation (roll, pitch, yaw)) of an object is responsive to inputted RGBD imaged to produce a generalizable model of the object without needing a preexisting specific 3D digital model of that object. A neural network is used to estimate certain 2D landmark features, or keypoints, of the object within the input image, and then uses a PnP random sample consensus (RANSAC) algorithm optimization to estimate the 6DOF pose of the object based on the estimated 2D keypoints.

Figure 5:
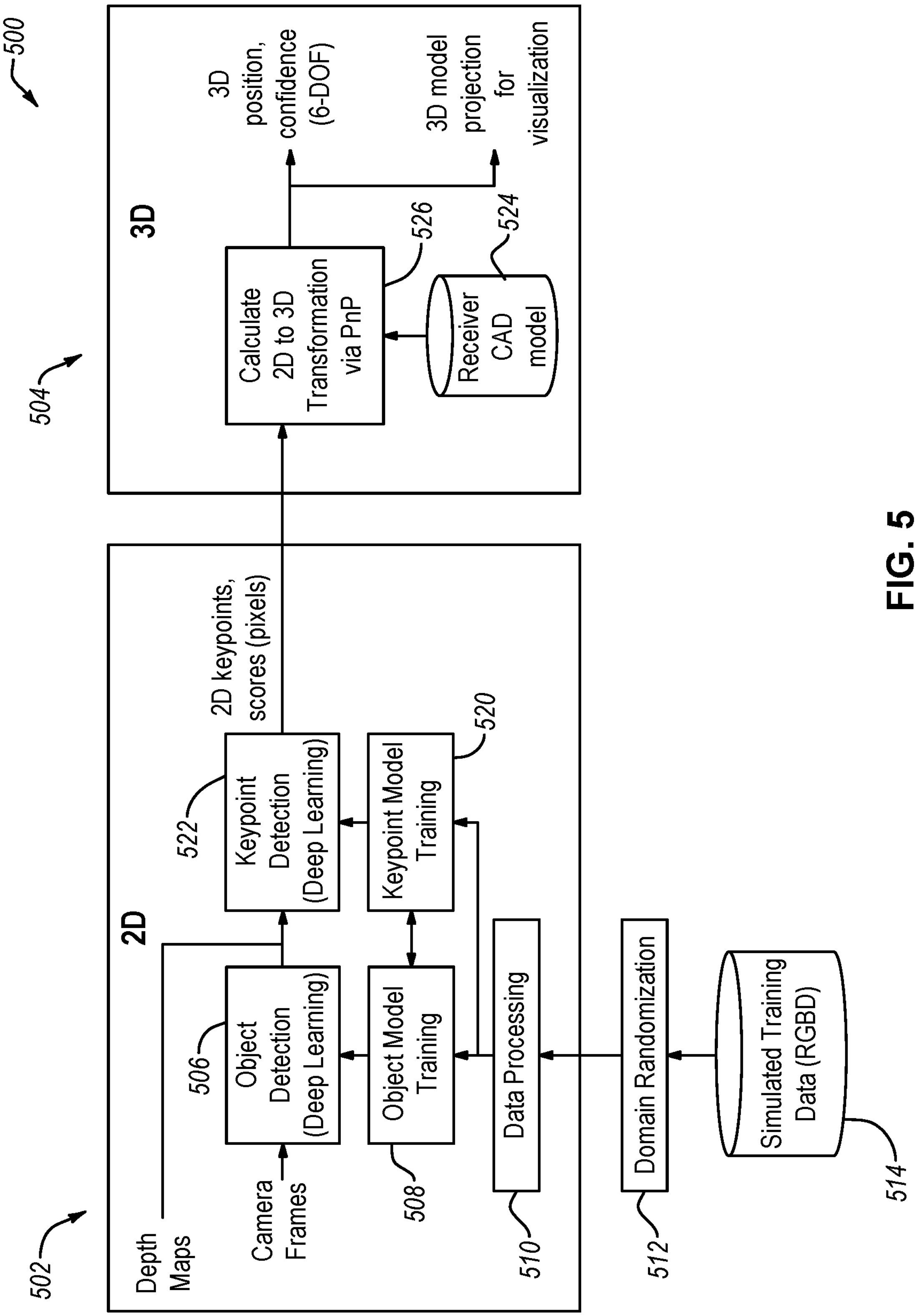
FIG. 5 is a schematic flow diagram of a system for optimizing image analysis for close quarter operations of vehicles, according to one or more examples of the present disclosure.

In various examples, and referring to FIG. 5, the processor 104 executes the instructions stored in the memory 114 to perform a process 500 that includes a 2D stage 502 and a 3D stage 504. The 2D stage 502 includes pre-processing steps (e.g., object model training 508 and keypoint model training 520) and runtime steps (e.g., object detection 506 and keypoint detection 522).

In various examples, an open-source library (e.g., pyrender) is used to render the RGBD images. For example, a computer-aided design (CAD)/computer graphics model of a target object can be used to render the image in a scene. Per-pixel depth data, which is included in the rendering process, is stored in an unsigned 16-bit integer channel alongside the RGB image. The per-pixel depth data is initially a depth value in real world units. Then, the per-pixel depth data is quantized and stored in an unsigned 16 bit pattern in order to save it as a depth image, similar to what depth sensors would return in the real world. In one example, a range limit of 200' is used to define linear mapping from real world values to the quantized unsigned 16 bit values. Values of O's in a depth channel indicate that the object does not occupy the given pixel, and otherwise larger pixel values indicate how far away the object is in the image.

The object model training 508 involves training a deep neural network to predict bounding boxes around the region (s) of interest on the receiver during runtime operation in the block denoted object detection 506. The data processing 510 involves reshaping of the data array containing the training data and subsequent normalization of the pixel values of the training data in a manner suitable for training a deep neural network. The domain randomization 512 is a data augmentation method that applies various image transforms to the training data in order to improve the robustness of trained deep neural networks to novel situations. Some of the various image transforms used in domain randomization 512 include random brightness adjustments, contrast adjustments, noise additions, cutout of parts of the image, etc. The simulated training data (RGBD) 514 is a database of image training data that contains images of the receiver aircraft 202 for which we want to detect bounding boxes and keypoints.

At a block 510, pre-processing the depth image for training starts with adding simulated sensor noise. This is done by first transforming the quantized depth values z from the RGBD image back into real world units, e.g., $$z' = z/65535 * 200$$

where 65535 is the max range of unsigned 16-bit integers and 200 feet is the threshold in real world units for our mapping from real world units to quantized units. Then, sensor noise is computed based on the real-world depth values in a manner where pixels that have higher depth values will have more noise. One example for doing this is to use a stereo sensor noise model via the following equation:

$$z'' = z'^\wedge 2/f * b$$

where f is the focal length, and b is the baseline of the stereo camera setup. Then, the quantized depth values z are re-mapped in a linear transform f(z, c) such that the minimum value maps to 1, and the maximum value maps to c, where 0<c<1, i.e., 0 represents far away objects and c represents closer objects. Finally, the sensor noise can be drawn from a zero mean Gaussian noise distribution N with variance s*z"*f(z, c), where s<1 is a scalar to adjust the intensity of the noise. Therefore, the sensor noise that is added to the depth values can be represented by the following:

$$N \sim (0, s * z'' * f(z, c))$$

which denotes a Gaussian distribution with zero mean and a variance that is smaller for objects closer to the sensor and larger for objects farther from the sensor. Finally, after noise is added, the resulting values are clipped within the range [0, 1]. Optionally, before this final clipping step, zero mean and 0.01 variance Gaussian noise is added with random probability for training augmentation. In the case of a negative training example, the depth map is set to all 0s.

At a keypoint model training 520 of the 2D stage 502, a deep neural network (e.g., a convolutional neural network (CNN)) is trained to identify features/keypoints on the 3D virtual/digital model from the RGB image and the depth image (i.e., depth maps).

In various examples, during training of the CNN, the CNN takes the RGBD images as input and returns a black and white heatmap image for each keypoint as output. The pixel values of the heatmap image indicate, for each keypoint, the likelihood of the keypoint being found at each pixel location of the image once the object has been projected onto the image. To train the weights of the CNN, ground truth heatmaps are constructed from ground truth 2D pixel locations. The pixel values of the ground truth heatmaps are assigned the values of a Gaussian probability distribution over 2D coordinates with mean of the Gaussian distribution equal to the ground truth 2D pixel location and covariance left as a hyperparameter for training. The loss that is minimized during training is composed of the Jensen-Shannon divergence between the CNN's heatmap outputs and the ground truth heatmaps and the Euclidean norm between the CNN's 2D keypoint estimates and the ground truth 2D keypoints.

In various examples, training of the CNN uses a domain randomization (DR) process in which several 3D augmentations are performed along with 2D augmentations. The 3D augmentations are randomly chosen positions and orientations, along with random materials and coatings of the object and random positioning and intensity of lighting. The 2D augmentations include random dropouts of the image, blurring, lighting and contrast changing. By adjusting all of these 3D and 2D parameters, a wide array of views of what the boom could look like in different positions, materials, and lightings are attained.

Figure 6:
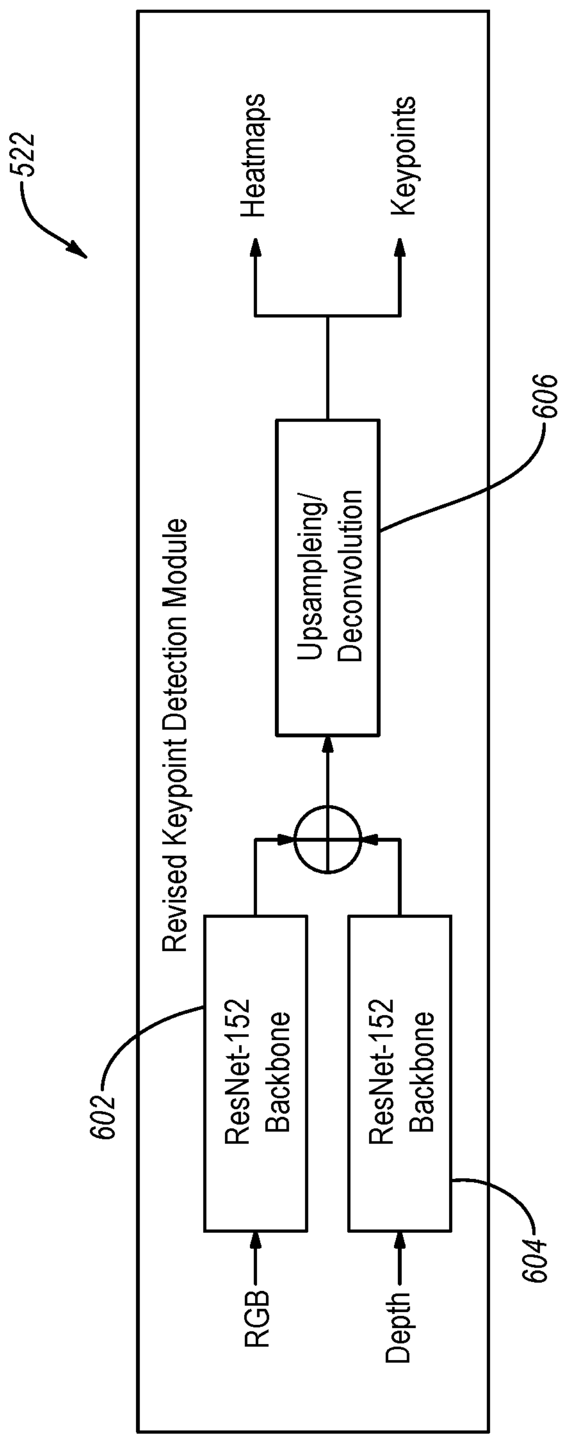
FIG. 6 is a schematic flow diagram of a system for performing keypoint detection, according to one or more examples of the present disclosure.

Referring to FIG. 6, the keypoint detection 522 uses two residual neural network (ResNet) feature extractors (one for an RGB extraction backbone 602 and one for a depth extraction backbone 604). Feature vectors, which are lower dimensional encoding of the input data, from the RGB extraction backbone 603 and the depth extraction backbone 604 are added together before going into an upsampling/deconvolution 606. The CNN removes final pooling and fully connected layers of the architecture and replaces them with a series of deconvolutional or upsampling layers in the upsampling/deconvolution 606, which outputs an output image matching the height and width of the input image with the number of keypoints matching the number of channels. Each of the channels is considered to be a heatmap of where the keypoint is located in 2D image space. From the heatmap, the pixel at the center of the distribution represented by the heatmap is chosen to be the position of the keypoint (i.e., the 2D keypoint predictions).

Six Degree-of-Freedom (6DOF) Pose Estimation

In various examples, and referring back to FIG. 5, the processor 104 turns the 2D keypoint predictions into 6DOF estimations at a block 526. The PnP algorithm is used to perform the transformation previously described. In various examples, a random sample consensus (RANSAC) PnP algorithm (e.g., OpenCV) is used.

Figure 7:
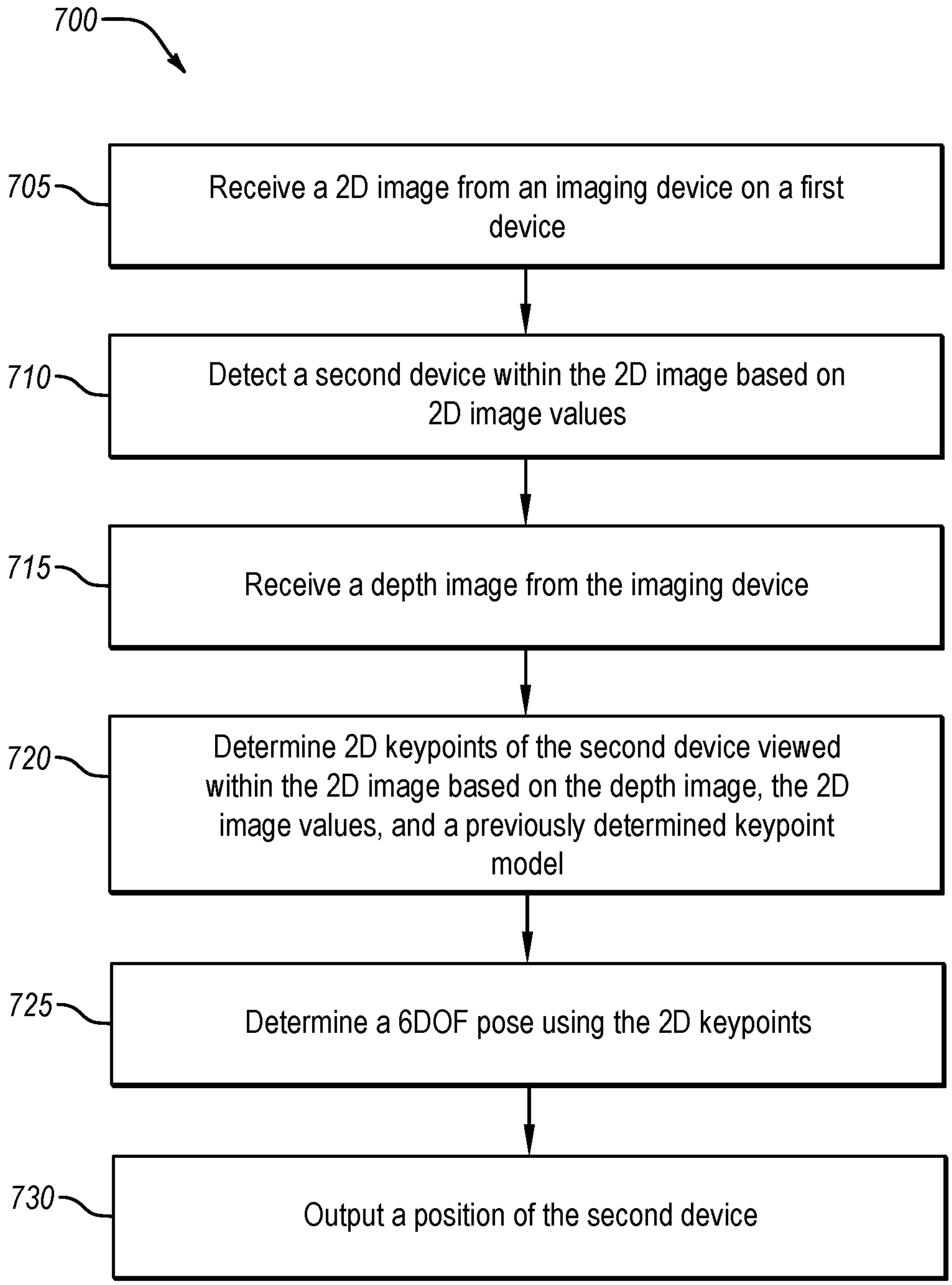
FIG. 7 is a schematic flow chart of a method of determining target object location, according to one or more examples of the present disclosure.

Referring to FIG. 7, a method 700 includes automatically determining position of a receiver aircraft for presentation or for automatically controlling an automated refueling system. The block 705 includes receiving a 2D image from an imaging device on a first device. The block 710 includes detecting a second device within the 2D image based on 2D image values. The block 715 includes receiving a depth image from the imaging device. The block 720 includes determining 2D keypoints of the second device viewed within the 2D image based on the depth image, the 2D image values, and a previously determined keypoint model. The block 725 includes determining a 6DOF pose using the 2D keypoints. The block 730 includes outputting a position of the second device.

The following is a non-exhaustive list of examples, which may or may not be claimed, of the subject matter, disclosed herein.

The following portion of this paragraph delineates example 1 of the subject matter, disclosed herein. According to example 1, a method includes receiving a 2D image from an imaging device of a first device, detecting a second device within the 2D image based on 2D image values, receiving a depth image from the imaging device, determining 2D keypoints of the second device located within the 2D image based on the depth image, the 2D image values, and a previously determined keypoint model, determining a 6DOF pose using the 2D keypoints and corresponding 3D keypoints, and outputting a position of at least a component of the second device based on the 6DOF pose.

The following portion of this paragraph delineates example 2 of the subject matter, disclosed herein. According to example 2, which encompasses example 1, above, the imaging device comprises a stereoscopic camera system.

The following portion of this paragraph delineates example 3 of the subject matter, disclosed herein. According to example 3, which encompasses any of examples 1 or 2, above, the imaging device comprises a camera with depth sensing capabilities.

The following portion of this paragraph delineates example 4 of the subject matter, disclosed herein. According to example 4, which encompasses any of examples 1-3, above, the 2D image values comprise multiple colors or intensities.

The following portion of this paragraph delineates example 5 of the subject matter, disclosed herein. According to example 5, which encompasses example 4, above, the 2D image values comprise RGB values.

The following portion of this paragraph delineates example 6 of the subject matter, disclosed herein. According to example 6, which encompasses example 5, above, the method further includes training a neural network using the RGB values and the depth image to produce estimates of 2D keypoints. The method determines the 2D keypoints using the neural network.

The following portion of this paragraph delineates example 7 of the subject matter, disclosed herein. According to example 7, which encompasses example 6, above, training the neural network comprises simulating sensor noise by randomly augmenting the depth image.

The following portion of this paragraph delineates example 8 of the subject matter, disclosed herein. According to example 8, a tanker aircraft comprising a camera system configured to generate a 2D image of a receiving aircraft and a depth image of the receiving aircraft, a processor, and non-transitory computer readable storage media storing code. The code is executable by the processor to perform operations comprising detecting the receiving aircraft within the 2D image based on 2D image values, determining 2D keypoints of the receiving aircraft located within the 2D image based on the depth image, the 2D image values, and a previously determined keypoint model, determining a 6DOF pose using the 2D keypoints and corresponding 3D keypoints, and outputting a position of at least a component of the receiving aircraft based on the 6DOF pose.

The following portion of this paragraph delineates example 9 of the subject matter, disclosed herein. According to example 9, which encompasses example 8, above, the camera system comprises a stereoscopic camera system.

The following portion of this paragraph delineates example 10 of the subject matter, disclosed herein. According to example 10, which encompasses any of examples 8 or 9, above, the camera system comprises a camera with depth sensing capabilities.

The following portion of this paragraph delineates example 11 of the subject matter, disclosed herein. According to example 11, which encompasses any of examples 8-10, above, the 2D image values comprise multiple colors or intensities.

The following portion of this paragraph delineates example 12 of the subject matter, disclosed herein. According to example 12, which encompasses example 11, above, the 2D image values comprise RGB values.

The following portion of this paragraph delineates example 13 of the subject matter, disclosed herein. According to example 13, which encompasses example 12, above, the processor performs further operations comprising training a neural network using the RGB values and the depth image to produce estimates of 2D keypoints. Determining the 2D keypoints uses the neural network.

The following portion of this paragraph delineates example 14 of the subject matter, disclosed herein. According to example 14, which encompasses example 13, above, training the neural network comprises simulating sensor noise by randomly augmenting the depth image.

The following portion of this paragraph delineates example 15 of the subject matter, disclosed herein. According to example 15, a refueling system comprising a processor and non-transitory computer readable storage media storing code. The code being executable by the processor to perform operations comprising receiving a 2D image from an imaging device of a first device, detecting a second device within the 2D image based on 2D image values, receiving a depth image from the imaging device, determining 2D keypoints of the second device located within the 2D image based on the depth image, the 2D image values, and a previously determined keypoint model, determining a 6DOF pose using the 2D keypoints and corresponding 3D keypoints, and outputting a position of at least a component of the second device based on the 6DOF pose.

The following portion of this paragraph delineates example 16 of the subject matter, disclosed herein. According to example 16, which encompasses example 15, above, the imaging device comprises a stereoscopic camera system or a camera with depth sensing capabilities.

The following portion of this paragraph delineates example 17 of the subject matter, disclosed herein. According to example 17, which encompasses any of examples 15 or 16, above, the 2D image values comprise multiple colors or intensities.

The following portion of this paragraph delineates example 18 of the subject matter, disclosed herein. According to example 18, which encompasses example 17, above, the 2D image values comprise RGB values.

The following portion of this paragraph delineates example 19 of the subject matter, disclosed herein. According to example 19, which encompasses example 18, above, the processor performs further operations comprising training a neural network using the RGB values and the depth image to produce estimates of 2D keypoints. Determining the 2D keypoints uses the neural network.

The following portion of this paragraph delineates example 20 of the subject matter, disclosed herein. According to example 20, which encompasses example 19, above, training the neural network comprises simulating sensor noise by randomly augmenting the depth image.

Those of skill in the art will appreciate that the various illustrative logical blocks, modules, circuits, and algorithm steps described in connection with the examples disclosed herein may be implemented as electronic hardware, computer software, or combinations of both. Some of the examples and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples described herein are merely exemplary implementations.

The various illustrative logical blocks, modules, and circuits described in connection with the examples disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some examples may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method comprising:

receiving a two-dimensional (2D) image from an imaging camera of an imaging device of a first device;

detecting a second device within the 2D image based on 2D image values;

receiving a depth image from a depth camera of the imaging device, wherein the depth camera is a different type of camera than the imaging camera, and wherein the depth image is generated independently of the 2D image;

determining 2D keypoints of the second device located within the 2D image based on the depth image and the 2D image values by inputting the 2D image values and the depth image into a neural network keypoint model, wherein the neural network keypoint model is trained on a plurality of training depth images and a plurality of training 2D image values;

determining a 6 degree-of-freedom (6DOF) pose using the 2D keypoints and corresponding three-dimensional (3D) keypoints; and outputting a position of at least a component of the second device based on the 6DOF pose.

2. The method of claim 1, wherein the depth camera comprises a range sensing device.

3. The method of claim 1, wherein the depth camera comprises a camera with depth sensing capabilities.

4. The method of claim 1, wherein the 2D image values comprise multiple colors or intensities.

5. The method of claim 4, wherein the 2D image values comprise red, green, and blue (RGB) values.

6. The method of claim 5, further comprising training the neural network keypoint model using the RGB values and the depth image to produce estimates of 2D keypoints.

7. The method of claim 6, wherein training the neural network keypoint model comprises randomly augmenting the depth image provided as an input to the neural network keypoint model by applying simulated sensor noise that varies as a function of a distance to the object represented by the depth image.

8. The method of claim 1, wherein determining the 6DOF pose comprises computing a perspective-n-point (PnP) solution using the 2D keypoints and corresponding 3D keypoints.

9. The method of claim 1, wherein determining the 2D keypoints comprises:
- extracting image features from the 2D image values using a first neural-network feature extractor;
- extracting depth features from the depth image using a second neural-network feature extractor; and
- combining the extracted image features and depth features to determine the 2D keypoints.

10. A tanker aircraft comprising:
- a camera system comprising an imaging camera configured to generate a two-dimensional (2D) image of a receiving aircraft and a depth camera configured to generate a depth image of the receiving aircraft, wherein the depth camera is a different type of camera than the imaging camera, and wherein the depth image is generated independently of the 2D image;
- a processor; and
- non-transitory computer readable storage media storing code, the code being executable by the processor to perform operations comprising:
  - detecting the receiving aircraft within the 2D image based on 2D image values;
  - determining 2D keypoints of the second device located within the 2D image based on the depth image and the 2D image values by inputting the 2D image values and the depth image into a neural network keypoint model, wherein the neural network keypoint model is trained on a plurality of training depth images and a plurality of training 2D image values;
  - determining a 6 degree-of-freedom (6DOF) pose using the 2D keypoints and corresponding three-dimensional (3D) keypoints; and
  - outputting a position of at least a component of the receiving aircraft based on the 6DOF pose.

11. The tanker aircraft of claim 10, wherein the depth camera comprises a range sensing device.

12. The tanker aircraft of claim 10, wherein the depth camera comprises a camera with depth sensing capabilities.

13. The tanker aircraft of claim 10, wherein the 2D image values comprise multiple colors or intensities.

14. The tanker aircraft of claim 13, wherein the 2D image values comprise red, green, and blue (RGB) values.

15. The tanker aircraft of claim 14, wherein the processor performs further operations comprising training the neural network keypoint model using the RGB values and the depth image to produce estimates of 2D keypoints.

16. The tanker aircraft of claim 15, wherein training the neural network keypoint model comprises simulating sensor noise by randomly augmenting the depth image.

17. A refueling system comprising:
- a processor; and
- non-transitory computer readable storage media storing code, the code being executable by the processor to perform operations comprising:
  - receiving a two-dimensional (2D) image from an imaging camera of an imaging device of a first device;
  - detecting a second device within the 2D image based on 2D image values;
  - receiving a depth image from a depth camera of the imaging device, wherein the depth camera is a different type of camera than the imaging camera, and wherein the depth image is generated independently of the 2D image;
  - determining 2D keypoints of the second device located within the 2D image based on the depth image and the 2D image values by inputting the 2D image values and the depth image into a neural network keypoint model, wherein the neural network keypoint model is trained on a plurality of training depth images and a plurality of training 2D image values;
  - determining a 6 degree-of-freedom (6DOF) pose using the 2D keypoints and corresponding three-dimensional (3D) keypoints; and
  - outputting a position of at least a component of the second device based on the 6DOF pose.

18. The refueling system of claim 17, wherein the depth camera comprises a range sensing device or a camera with depth sensing capabilities.

19. The refueling system of claim 17, wherein the 2D image values comprise multiple colors or intensities.

20. The refueling system of claim 19, wherein the 2D image values comprise red, green, and blue (RGB) values.

* * * * *